(12) United States Patent
Ben-Hagai

(10) Patent No.: US 10,523,584 B2
(45) Date of Patent: Dec. 31, 2019

(54) SOFTWARE-DEFINED SOCKET ACTIVATION

(71) Applicant: Interwise Ltd., Airport City (IL)

(72) Inventor: Yossi Ben-Hagai, Petah Tikva (IL)

(73) Assignee: Interwise Ltd., Airport City (IL)

( * ) Notice: Subject to any disclaimer, the term of this patent is extended or adjusted under 35 U.S.C. 154(b) by 249 days.

(21) Appl. No.: 15/390,338

(22) Filed: Dec. 23, 2016

(65) Prior Publication Data

US 2018/0183725 A1    Jun. 28, 2018

(51) Int. Cl.
| | |
|---|---|
| *H04L 12/911* | (2013.01) |
| *H04L 12/26* | (2006.01) |
| *H04L 29/08* | (2006.01) |
| *H04L 12/947* | (2013.01) |
| *H04L 12/935* | (2013.01) |
| *H04L 12/931* | (2013.01) |
| *G06F 15/173* | (2006.01) |
| *G06F 9/50* | (2006.01) |

(52) U.S. Cl.
CPC .......... *H04L 47/781* (2013.01); *H04L 49/252* (2013.01); *H04L 49/3009* (2013.01); *H04L 49/70* (2013.01); *H04L 67/10* (2013.01)

(58) Field of Classification Search
USPC ............................ 709/228, 244, 220–226
See application file for complete search history.

(56) References Cited

U.S. PATENT DOCUMENTS

| | | | |
|---|---|---|---|
| 8,352,953 B2 | 1/2013 | Bozek et al. | |
| 9,043,445 B2* | 5/2015 | DeLuca | G06F 9/5077 709/220 |
| 9,311,160 B2 | 4/2016 | Parker | |
| 9,350,677 B2 | 5/2016 | Mann et al. | |
| 10,148,493 B1* | 12/2018 | Ennis, Jr. | H04L 41/0803 |
| 2010/0042720 A1* | 2/2010 | Stienhans | G06F 9/5072 709/226 |
| 2010/0169477 A1* | 7/2010 | Stienhans | G06F 9/5083 709/224 |
| 2010/0169497 A1* | 7/2010 | Klimentiev | G06F 9/546 709/228 |
| 2011/0075667 A1* | 3/2011 | Li | H04L 12/4633 370/392 |
| 2013/0215754 A1* | 8/2013 | Tripathi | H04L 49/253 370/236 |

(Continued)

OTHER PUBLICATIONS

Buyya et al.; "Software-Defined Cloud Computing: Architectural Elements and Open Challenges"; IEEE Int'l Conf. on Advances in Computing, Communications and Informatics (ICACCI); 2014; 12 pages.

(Continued)

*Primary Examiner* — Jude Jean Gilles
(74) *Attorney, Agent, or Firm* — BakerHostetler

(57) ABSTRACT

Cloud providers must provide a consistently high availability of resources in order to respond to flexible demand. However, available but idle resources are inefficient. In order to improve the efficient utilization of cloud resources, incoming requests for cloud resources may be listened for and the resource started when the request is received. The flow may then be changed to reflect the started resource. When the resource becomes idle, it may be returned to the cloud.

20 Claims, 9 Drawing Sheets

(56) References Cited

U.S. PATENT DOCUMENTS

| | | | |
|---|---|---|---|
| 2013/0223438 A1* | 8/2013 | Tripathi | H04L 45/66 370/355 |
| 2013/0235870 A1* | 9/2013 | Tripathi | H04L 41/5019 370/390 |
| 2013/0242983 A1* | 9/2013 | Tripathi | H04L 49/25 370/355 |
| 2014/0006095 A1* | 1/2014 | Doran | G06Q 10/10 705/7.28 |
| 2015/0215231 A1 | 7/2015 | Liu et al. | |
| 2015/0341230 A1* | 11/2015 | Dave | H04L 41/5058 705/7.29 |
| 2015/0372812 A1* | 12/2015 | Parann-Nissany | H04L 63/06 380/44 |
| 2016/0065454 A1 | 3/2016 | Arumugam et al. | |
| 2016/0080266 A1 | 3/2016 | Fujii et al. | |
| 2016/0087885 A1* | 3/2016 | Tripathi | G06F 9/45558 370/389 |
| 2016/0087894 A1 | 3/2016 | Chen et al. | |
| 2016/0112503 A1 | 4/2016 | Yang | |
| 2016/0135111 A1 | 5/2016 | Huang et al. | |
| 2016/0142977 A1 | 5/2016 | Hoffmann | |
| 2016/0149806 A1 | 5/2016 | Park et al. | |
| 2016/0173407 A1* | 6/2016 | Tung | G06F 9/5072 709/226 |
| 2016/0241491 A1* | 8/2016 | Tripathi | H04L 49/1523 |
| 2017/0026283 A1* | 1/2017 | Williams | H04L 45/64 |
| 2017/0214632 A1* | 7/2017 | Ravi | G06F 16/24578 |
| 2018/0095771 A1* | 4/2018 | Warkentin | G06F 9/4416 |

OTHER PUBLICATIONS

Azodolmolky et al.; "SDN-based Cloud Computing Networking"; IEEE 15$^{th}$ Int'l Conf. on Transparent Optical Networks (ICTON); 2013; 5 pages.

* cited by examiner

SOFTWARE-DEFINED SOCKET ACTIVATION

BACKGROUND

Cloud computing offers scalability, providing resources on demand therefore eliminating the need for users to make long-term commitments to infrastructure. The on-demand nature of cloud resources requires cloud services to be constantly available in order to respond to increasing demand. While cloud services can scale-out in response to increased demand, scaling-in services in response to decreasing demand is more challenging. A minimal level of cloud services, even though idle, must be maintained or availability of the service is compromised. The current practice is to keep idle cloud services and infrastructure running in order to maintain availability. Idle services consume cloud resources, such as memory, processing power, and electrical power, without delivering value. There is therefore a need for cloud services to be managed efficiently to prevent idle services from wasting cloud resources.

SUMMARY

The disclosed systems, methods, and apparatuses allow for software-defined socket activation.

In an aspect, a system may include a processor and a memory coupled to the processor with instructions stored thereon. The instructions cause the processor to effectuate operations, including receiving a request for a cloud resource and, responsive to that request, generating an instance of the cloud resource and associating an address with the cloud resource. The operations may also include inserting the address associated with the instance of the cloud resources into a forwarding table of a switch and employing the switch to forward traffic to the instance of the cloud resource.

In an aspect, a method may include receiving a request for a cloud resource by a controller. The method may also include generating, by the controller, an instance of the cloud resource in response to the request and associating an address with the instance of the cloud resource. The method may also include inserting, by the controller, the address associated with the cloud resources into a forwarding table of a switch and employing the switch to forward traffic to the instance of the cloud resource.

In an aspect, a computer-readable storage medium may include executable instructions that cause a processor executing the instructions to receive a request for a cloud resource and, responsive to that request, generate an instance of the cloud resource and associate an address with the instance of the cloud resource. The processor executing the instructions may also insert the address associated with the cloud resources into a forwarding table of a switch and employ the switch to forward traffic to the instance of the cloud resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Aspects of the herein software-defined socket activation are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

DETAILED DESCRIPTION OF ILLUSTRATIVE EMBODIMENTS

Figure 1:
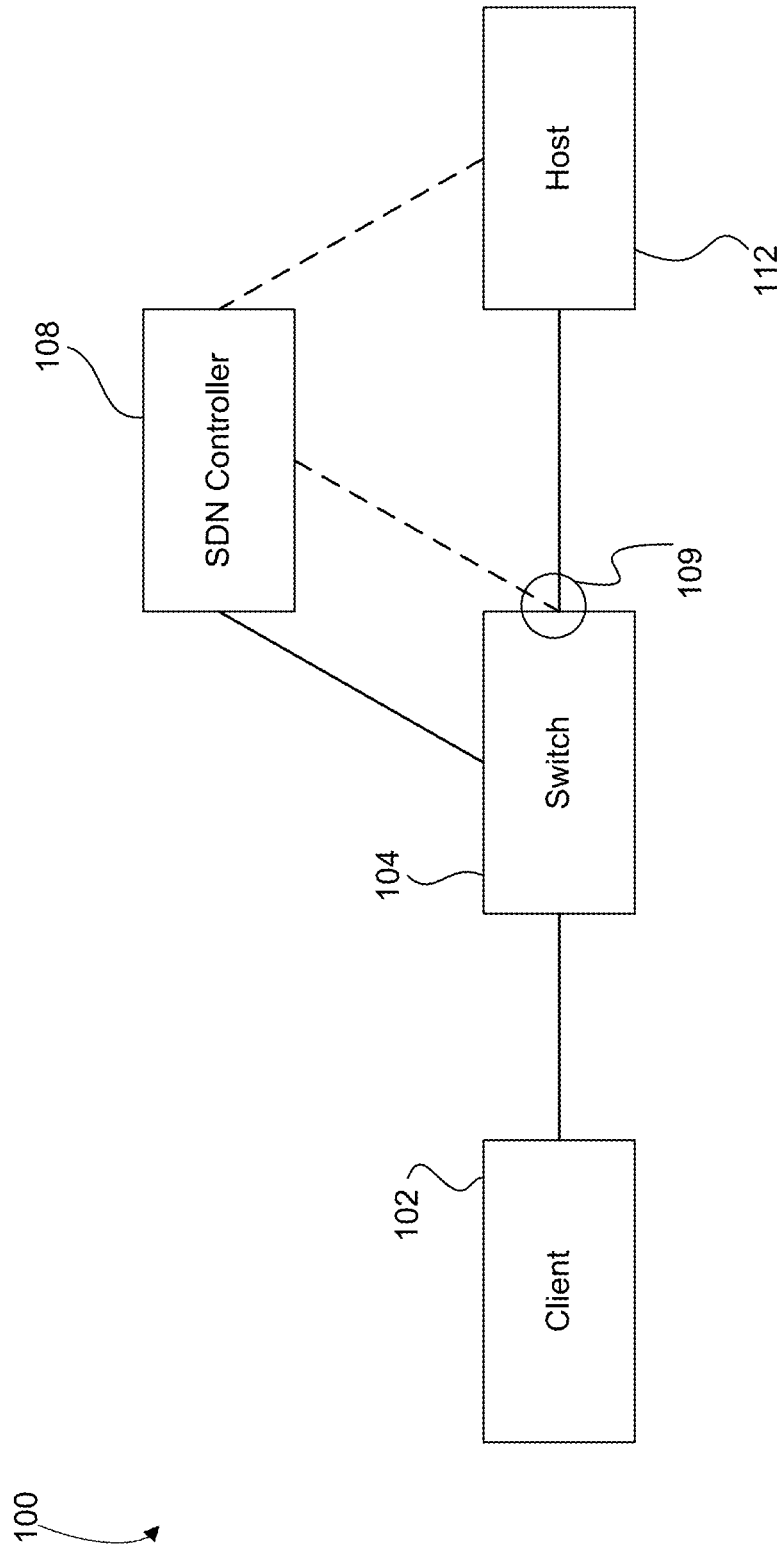
FIG. 1 is a depiction of an illustrative diagram of a network which may be utilized for software-defined socket activation.

FIG. 1 illustrates an exemplary architecture of network 100 which software-defined socket activation may be used with. Client 102 may be in communication with switch 104. Switch 104 may be in communication with software-defined network (SDN) controller 108. SDN controller 108 is integrated with a datacenter orchestration function, allowing it to startup resources, such as, for example, virtual machines, Linux containers, and physical servers driven by network requests, as detected by the network switch. For example, when SDN controller 108 receives a notification from switch 104 indicating a request for a resource from client 102, it analyzes the packets and determines the resource requested. This may be based on, for example, packet header information. For example, a certain destination address may be associated with a certain cloud service, and the resource requested may therefore be the resource required in order to service requests for that service. SDN controller 108 instructs the datacenter orchestration function to instantiate host 112. Host 112 may be a resource such as, for example, an application, a server, virtual machine (VM), or Linux container. Host 112 may be, for example, a server, and instantiating host 112 may include starting the server. Once host 112 is instantiated, SDN controller 108 instructs switch 104 to forward the request from client 102 to host 112. In instructing switch 104 to forward the request from client 102 to host 112, SDN controller 108 inserts the destination address for host 112 into the flow 109 for switch 104. Once host 112 becomes idle again, the datacenter orchestration function stops host 112 and sends a notification to SDN controller 108 to reprogram switch 104 to detect incoming network connection requests to idle hosts. Host 112 may not necessarily be stopped immediately, but may stopped after an idle period. The duration of the idle period before host 112 is stopped (a "time out" period or limit) may depend on the type of resource used and usage patterns. For example, there may be a default time out period, and the default may be adjusted for the type of resource used.

Client 102 may be any entity that can send a request to host 112 and consume a resource of the datacenter. For example, a virtual set-top box (STB) service may be provided by a cloud datacenter. Client 102 may send a request for STB service, and a virtual STB may be instantiated. Packets to the virtual STB have the destination for the virtual STB inserted by switch 104. One example of a virtual STB service is where a virtual STB is generated as a media server. As another example, the virtual STB can be generated as a virtual machine. An appropriate display device, such as a television, can connect to the cloud datacenter using, for example, a gateway. Requests to the virtual STB include such requests as, for example, to change a channel.

It is common for STBs to be on but not in use. Datacenter resources are used to maintain a virtual STB instance. To save resources, after an idle period, the virtual STB may be directed to shut down by, for example, the datacenter orchestration function. If a new request is received after the virtual STB is shut down, a new virtual STB instance (host 112) is instantiated, and the address of the new virtual STB is inserted into the flow of traffic 109 from switch 104.

In an aspect, a cloud datacenter may implement a honeypot service. Switch 104 may receive a request that is determined to be malicious. In an aspect, an IP address may be used to identify malicious traffic. For example, the IP address may not be assigned to a legitimate or actual resource. SDN controller 108 may determine that a packet is malicious traffic based on it being received by switch 104 and directed to such an IP address. A packet may also be determined to be malicious traffic based on other analysis, such as content or origination analysis. In response to malicious traffic (traffic received by switch 104 directed to the designated IP address), SDN controller 108 may instantiate a "honeypot" resource (host 112). SDN controller 108 inserts the destination address for the honeypot resource 112 into the flow of traffic 109 from switch 104. Malicious traffic can then be automatically directed by switch 104 to the honeypot resource 112.

In an aspect, a developer sandbox service may be implemented. Code may be authored on a personal computer, then need to be tested on an environment similar to a production environment. A resource, such as a VM or container, may be used for the testing environment. Switch 104 may receive traffic addressed to the sandbox service. In response, a resource, such as a VM or container, may be instantiated and flow to the VM or container inserted. This relieves the developer from needing to start the resource. Furthermore, sandbox environments are generally short-lived because they are only needed to run tests and then become idle. Therefore, cloud resources may be more efficiently utilized by returning the idle resource to the cloud and only instantiating it when necessary.

Figure 2:
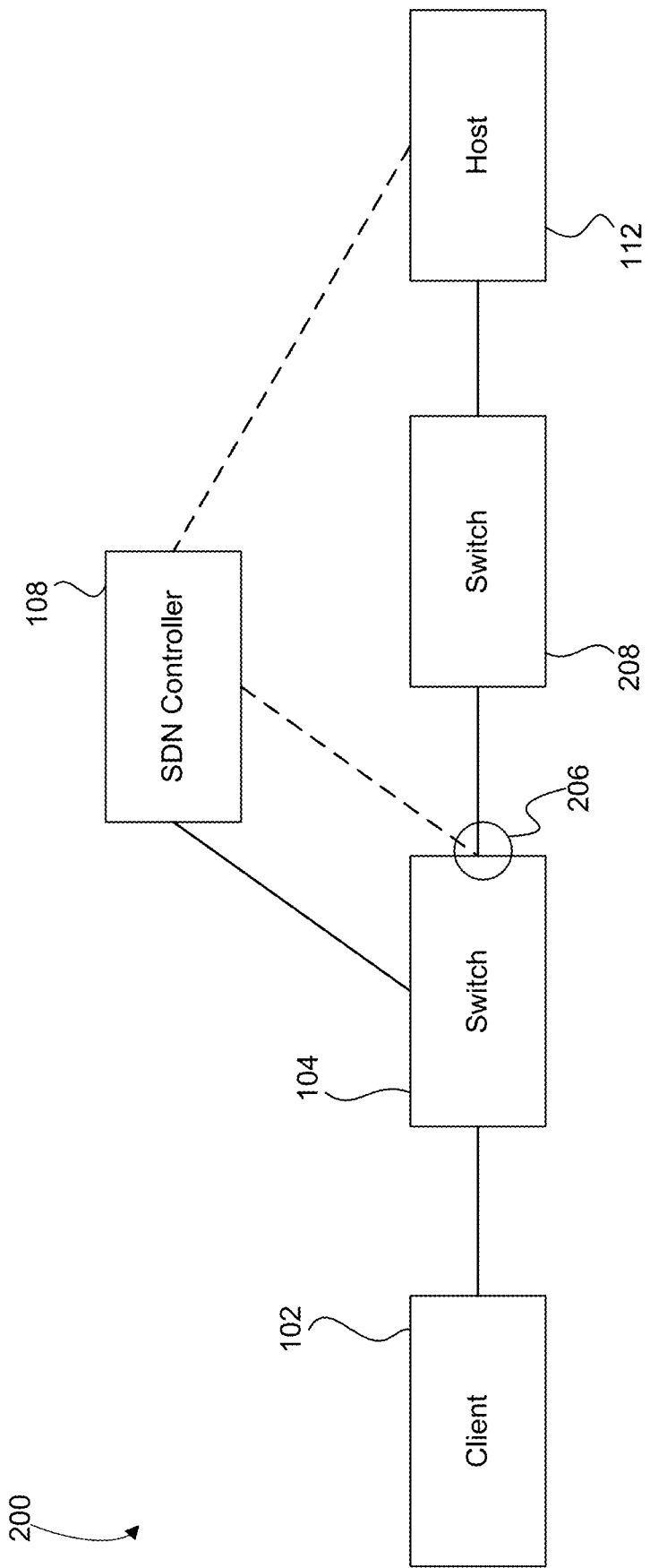
FIG. 2 is a depiction of an illustrative diagram of a network which may be utilized for software-defined socket activation.

FIG. 2 illustrates an exemplary architecture of network 200 which software-defined socket activation may be used with. Client 102 may be in communication with switch 104. Switch 104 may be in communication with SDN controller 108. As depicted in FIG. 1, when SDN controller 108 receives a notification from switch 104 indicating a request for a resource from client 102, it analyzes the packets and determines the resource requested. SDN controller 108 instructs the datacenter orchestration function to instantiate host 112. Once host 112 is instantiated, SDN controller 108 instructs switch 104 to forward the request from client 102 to host 112. In instructing switch 104 to forward the request from client 102 to host 112, SDN controller 108 inserts the destination address for host 112 into the flow from switch 104. Switch 208 may be in communication with switch 104. In order for packets from client 102 to reach host 112, the packets may need to pass through switch 208. Switch 208 receives packets from switch 104 after the address for host 112 has been inserted into the flow, and switch 208 forwards them accordingly to host 112. Switch 208 does not need to communicate with SDN controller 108 in order to forward the packets to host 112 and can forward them automatically.

In an aspect, switch 104 may be inserted artificially. For example, if it is determined that switch 208 does not support remote control of its forwarding tables or SDN controller 108 is otherwise unable to insert the destination address for host 112 into the flow from switch 208, switch 104 may be instantiated as a virtual switch by, for example, SDN controller 108. As another example, if SDN controller 108 cannot access the forwarding table of switch 208, switch 104 may be instantiated as a virtual switch by, for example, SDN controller 108. SDN controller 108 may not be able to access the forwarding table of switch 208 due to one or more causes, such as, for example, interruption of or lack of network connectivity (to or from switch 208 and/or to or from SDN controller 108). For example, switch 208 may forward packets to SDN controller 108 but SDN controller 108 may be unable to successfully communicate back to switch 208. SDN controller 108 may also not be able to access the forwarding table of switch 208 due to, for example, lack of privilege(s) or lack of a necessary privilege level to access the forwarding table. For example, SDN controller 108 may be able to communicate with switch 208 but be unable to access the forwarding table of switch 208 because SDN controller 108 does not have the necessary privilege/authority level. Similarly, if SDN controller 108 is able to access the forwarding table but not modify it, switch 104 may be instantiated as a virtual switch.

Figure 3:
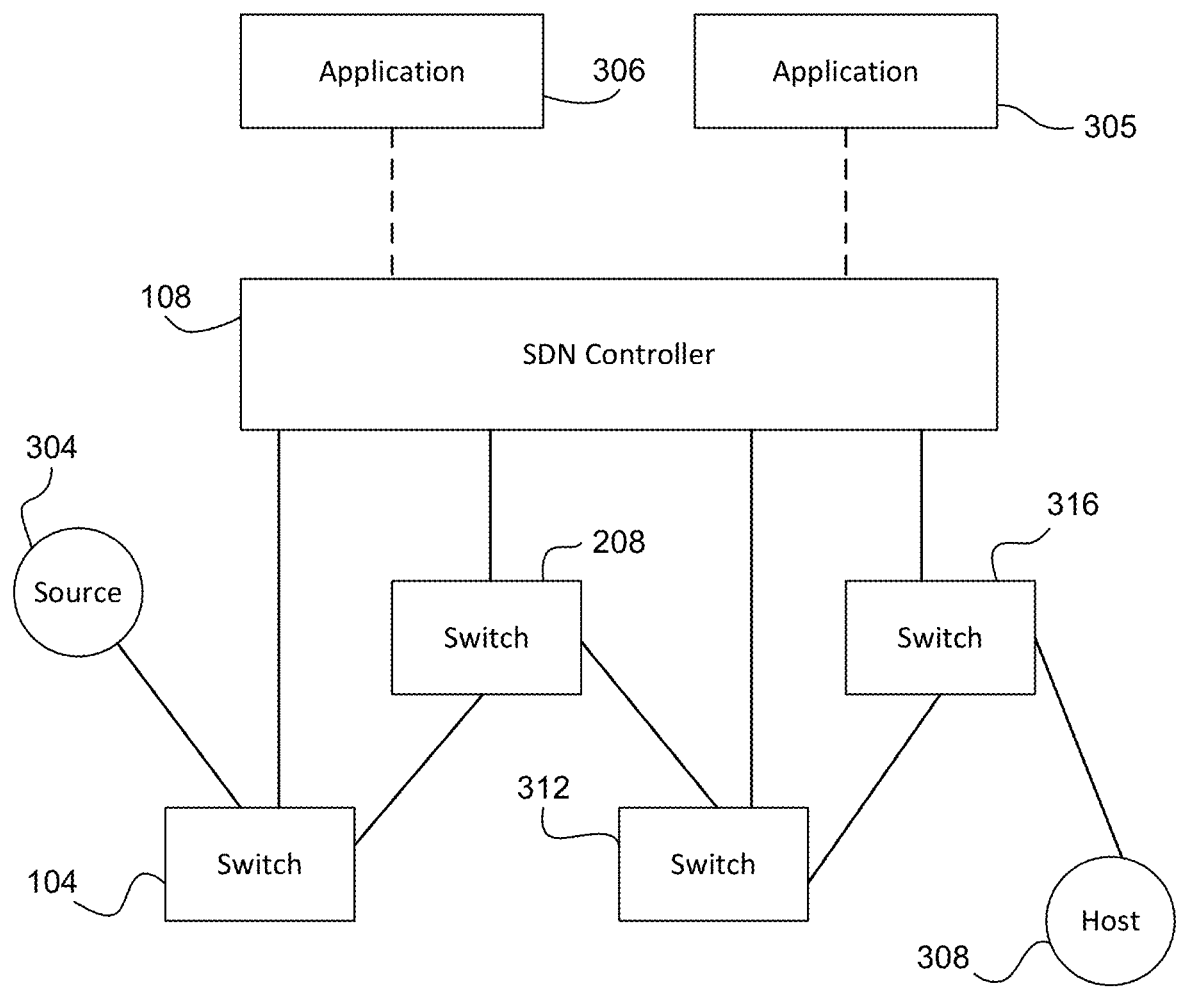
FIG. 3 is a depiction of an illustrative diagram of a network which may be utilized for software-defined socket activation.

FIG. 3 illustrates network 300 which software-defined socket activation may be used with. Source 304 is a source of a request for a cloud resource. Source 304 may be, for example, the original requesting device or a device passing the request on. Source 304 may be, for example, client 102. Switch 104 may be in communication with switch 208. Switch 208 may be in communication with switch 312. Switch 312 may be in communication with switch 316. Switch 316 may be in communication with host 308. Switch 104, 208, 312, and 316 may be in communication with SDN controller 108. SDN controller 108 may be interfaced with application 305 and application 306. Application 305 or application 306 may be, for example, a datacenter orchestration application.

One or more of switch 104, 208, 312, and 316 may be in communication with SDN controller 108, such that SDN controller 108 may update the forwarding tables of one or more of switch 104, 208, 312, and 316. At any switch in the network path to host 308, SDN controller 108 may update the forwarding table to alter the flow. This may be independent of any other manipulations of forwarding tables of other switches in the path done by SDN controller 108. Similarly, a resource, such as host 308, may be instantiated by SDN controller 108 in response to a request for a resource received by one or more of switch 104, 208, 312, and 316.

For example, switch 104 may receive a packet with a destination address for resource that needs to be instantiated, and host 308 may be instantiated. The forwarding table of switch 104 may then be updated by SDN controller 108 to reflect the address of host 308. Switch 104 may then forward the packet to switch 208. Switch 208 may forward traffic from switch 104 with the destination address of 308 to switch 312, and switch 312 may, in turn, forward the packet to switch 316, which may forward it to host 308. As another example, switch 208 may receive a packet from switch 104 indicating a request for a resource. Switch 208 may forward the packet to SDN controller 108, which may then update the forwarding table of switch 208. This may occur in addition to or without SDN controller 108 having updated the forwarding table of switch 104.

Figure 4:
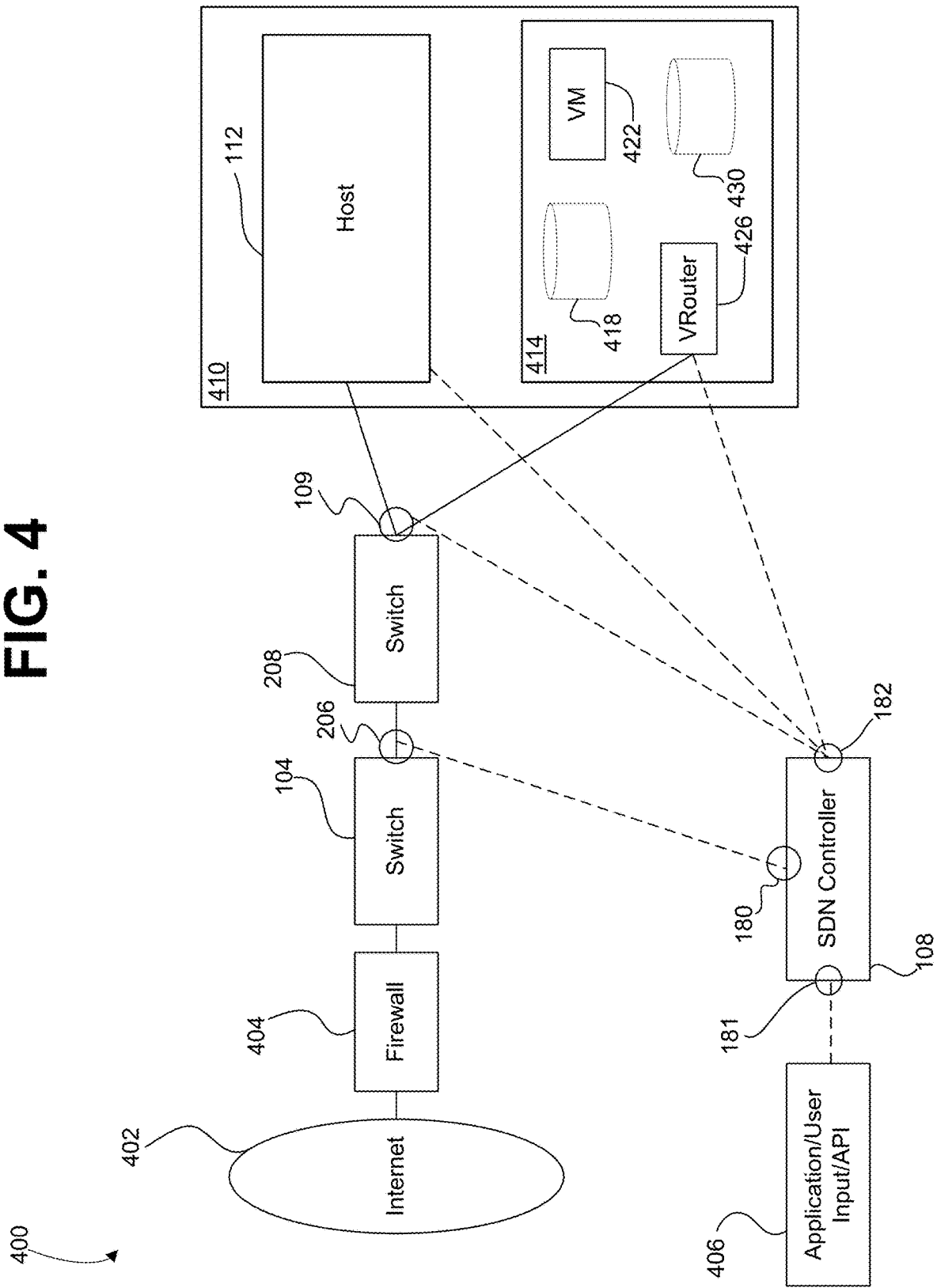
FIG. 4 is a depiction of an illustrative diagram of a network which may be utilized for software-defined socket activation.

FIG. 4 is a schematic of high-level system architecture for an embodiment of a system 400 for software-defined socket activation. The system includes a plurality of cloud resources 410 which may include host 112 and compute node 414. Host 112 may be, for example, a compute node. Associated with compute node 414 may be virtual machine (VM) 422, virtual router (VRouter) 426, data store 418, and data store 430. A VRouter is a software-based routing framework that allows the host machine to mimic a typical hardware router. A VRouter can enable a computer/server to have the abilities of a full-fledged router by performing the network and packet routing functionality of the router via a software application. It will be understood that any number of compute nodes are contemplated, each having any number of virtual machines and data stores. Host 112 and compute node 414 may be in communication with switch 208. Switch 104 may be a top-of-rack (ToR) switch. Switch 104 or 208 may also be a virtual switch, which is a software-based switching framework that allows the host machine to mimic a typical hardware switch. A virtual switch can enable a computer/server to have the abilities of a full-fledged switch by performing the network and packet-switching functionality of the switch via a software application. Switch 104 may be in communication with firewall 404 which may, in turn, be coupled to a network such as the Internet 402.

System 400 also includes SDN controller 108. SDN controller 108 may be an application that manages flow control to enable intelligent networking. SDN controller 108 may be based on protocols, such as OpenFlow, that allow the controller to tell network devices, such as switches, where to send packets. SDN controller 108 is in communication with compute node 414 and host 112. Associated with SDN controller 108 are southbound interfaces 181 and 182 and northbound interface 180. Northbound interface 181 interfaces SDN controller 108 to a higher functional layer, and may be used for communications between SDN controller 108 and applications that are higher-layer control programs. Southbound interfaces 181 and 182 serve as the interface which allows SDN controller 108 to communicate with SDN-enabled routers or switches. Its main function is to enable communications with SDN controller 108 and network nodes (both physical and virtual switches and routers) so that the router or switch can discover the network topology, define network flows, and implement requests related to it via northbound APIs.

Figure 5:
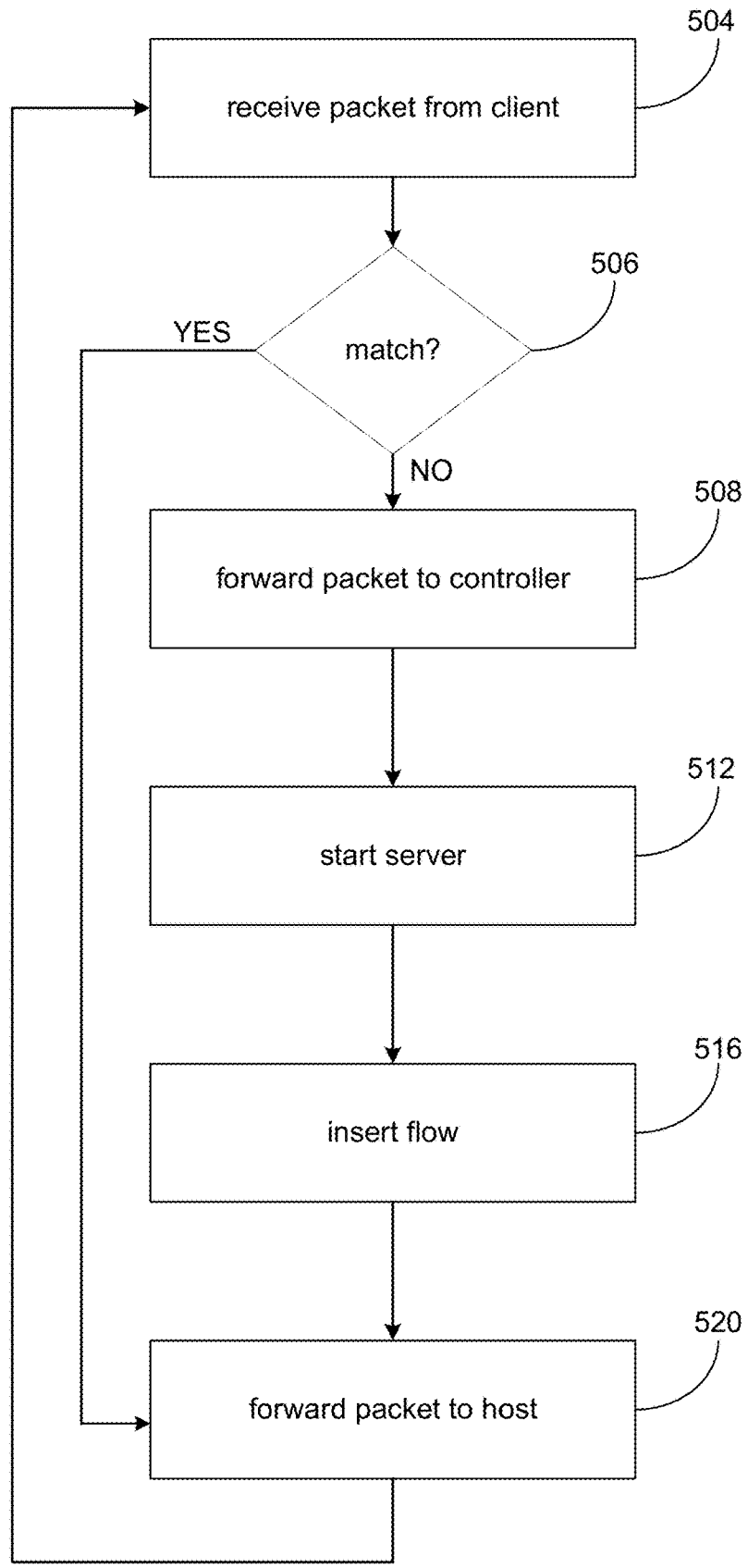
FIG. 5 is a depiction of an exemplary flow chart illustrating aspects of the present disclosure.

FIG. 5 is a flow chart illustrating aspects of the present disclosure. At 504, a packet is received from a client. For example, as shown in FIG. 1, switch 104 may receive a packet from client 102. At 506, the switch, such as switch 104, determines whether it has an entry in the forward table for the destination address of the packet. If there is a match, it forwards the packet accordingly. If not, at 508 the packet is forwarded to SDN controller 108. At 512, a resource, such as host 112, is started. At 516, flow is inserted. The destination address for the packet in the forwarding table of the switch is changed by the SDN controller 108 to the address of host 112. SDN controller 108 may generate instructions for switch 104 to alter its forwarding table and, when switch 104 receives them, the forwarding table of switch 104 may be changed. At 520, packets are forwarded to the host.

Figure 6:
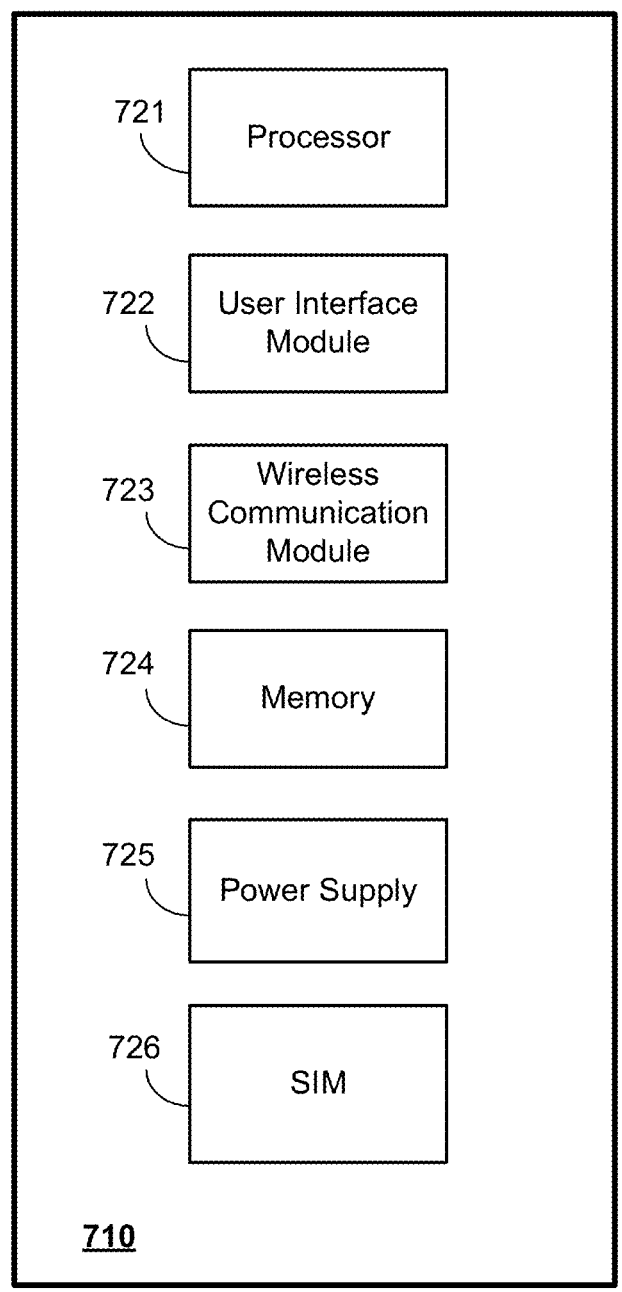
FIG. 6 is a block diagram of an example of a mobile device which may be utilized to facilitate software-defined socket activation.

FIG. 6 illustrates an example wireless device 710 that may be used in connection with an example of software-defined socket activation. References will also be made to other figures of the present disclosure as appropriate. It will be appreciated that the components and modules of wireless device 710 illustrated in FIG. 6 are illustrative, and that any number and type of components and/or modules may be present in wireless device 710. In addition, the functions performed by any or all of the components and modules illustrated in FIG. 6 may be performed by any number of physical components. Thus, it is possible that in some examples the functionality of more than one component and/or module illustrated in FIG. 6 may be performed by any number or types of hardware or hardware and software.

Processor 721 may comprise any appropriate circuitry that performs operations on behalf of wireless device 710. Such circuitry may include hardware and other components that enable processor 721 to perform any of the functions and methods described herein. Such circuitry and other components may also enable processor 721 to communicate and/or interact with other devices and components, for example any other component of device of wireless device 710, in such a manner as to enable processor 721 and such other devices and/or components to perform any of the disclosed functions and methods. In one example, processor 921 executes software (i.e., computer readable instructions stored in a computer readable medium) that may include functionality related to software-defined socket activation, for example. User interface module 722 may be any type or combination of hardware and software that enables a user to operate and interact with wireless device 710, and, in one example, to interact with a system enabling the user to place, request, and/or receive calls, text communications of any type, voicemail, voicemail notifications, voicemail content and/or data, and/or a system. For example, user interface module 722 may include a display, physical and/or "soft" keys, voice recognition software, a microphone, a touch screen, a speaker, and the like. A display of user interface module 722 may display, for example, application graphical user interfaces (GUIs), text, images, video, telephony functions such as Caller ID data, setup functions, menus, music, metadata, messages, wallpaper, graphics, Internet content, device status, preference settings, map and location data, routes and other directions, points of interest (POI), and the like. User interface module 722 may provide information visually (via, for example, a display), audibly (via, for example, a speaker), mechanically (via, for example, a vibrating mechanism such as a vibration motor), including haptically (or haptic feedback), or a combination thereof.

Wireless communication module 723 may be any type of transceiver including any combination of hardware and software that enables wireless device 710 to communicate with wireless network equipment. Memory 724 enables wireless device 710 to store information, such as APNs, MNCs, MCCs, text communications content and associated data, multimedia content, software to efficiently process radio resource requests and service requests, and radio resource request processing preferences and configurations.

Memory 724 may take any form, such as internal random access memory (RAM), an SD card, a microSD card and the like. Power supply 725 may be a battery or other type of power input (e.g., a charging cable that is connected to an electrical outlet, etc.) that is capable of powering wireless device 710. SIM 726 may be any type of Subscriber Identity Module and may be configured on a removable or non-removable SIM card that allows wireless device 710 to store data on SIM 726.

Figure 7:
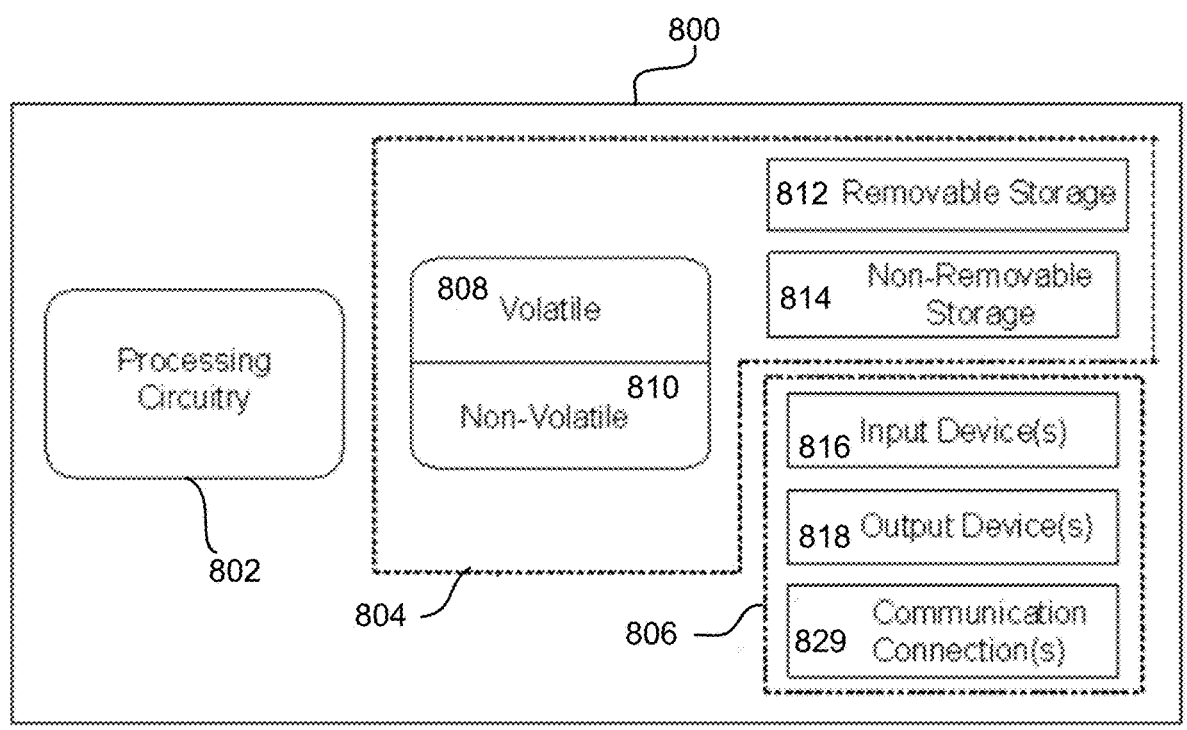
FIG. 7 is a block diagram of an example of a processor in which one or more disclosed examples may be implemented for software-defined socket activation.
Figure 8:
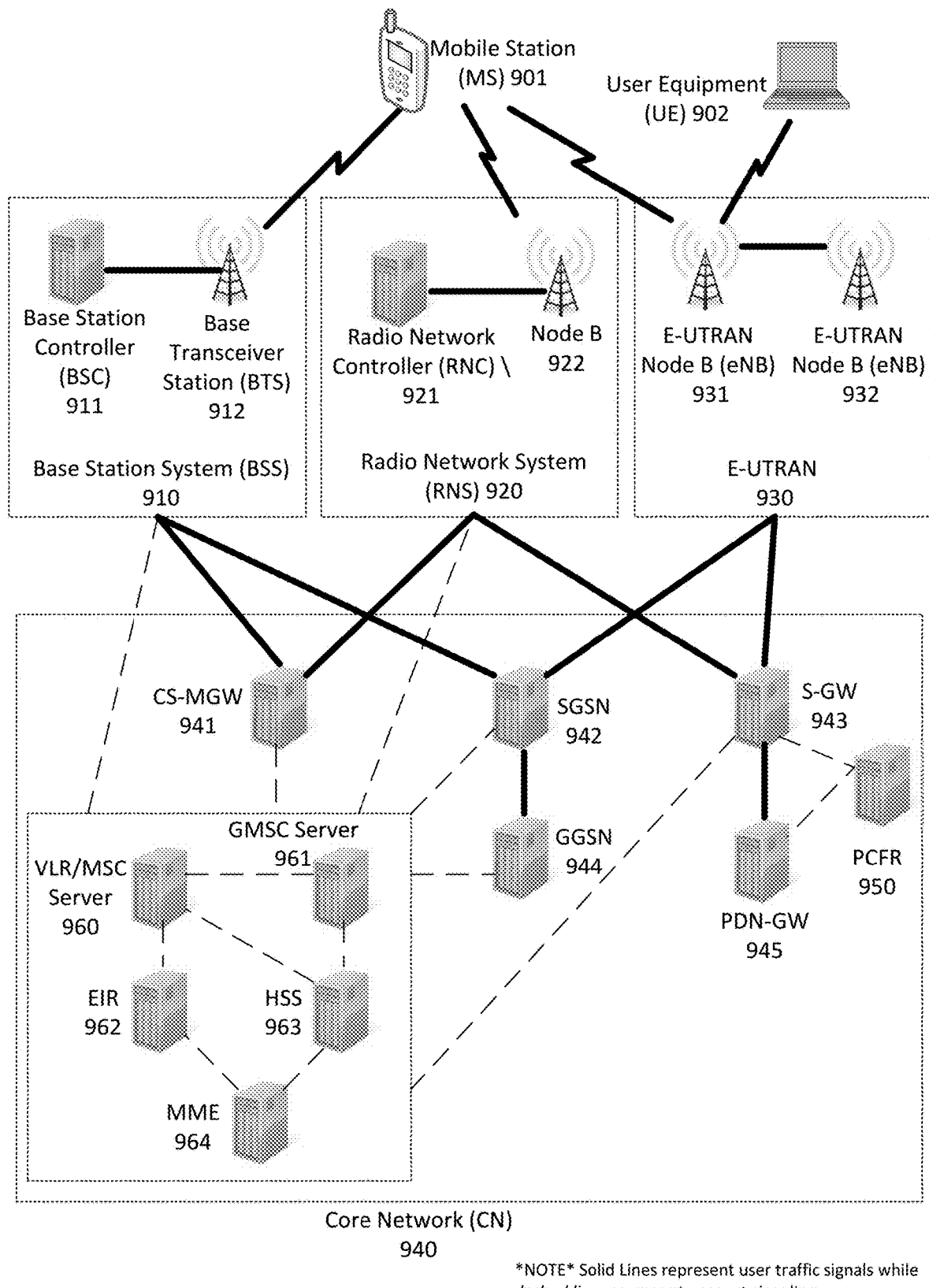
FIG. 8 illustrates a Public Land Mobile Network (PLMN) block diagram view of an exemplary architecture in which one or more disclosed examples may be implemented for software-defined socket activation.

FIG. 7 is a block diagram of an example apparatus 800 which may be employed in any of the examples described herein, including as one or more components of system 100, 200, 300 or 400, and/or any related equipment and/or as one or more components of any third party system or subsystem that may implement any portion of the subject matter described herein. Apparatus 800 may be a processor. It is emphasized that the block diagram depicted in FIG. 8 is exemplary and not intended to imply a specific implementation. Thus, the apparatus 800 may be implemented in a single processor or multiple processors. Multiple processors may be distributed or centrally located. Multiple processors can communicate wirelessly, via hard wire, or a combination thereof. Apparatus 800 may include circuitry and other components that enable apparatus 800 to perform any of the functions and methods described herein. Such circuitry and other components may also enable apparatus 800 to communicate and/or interact with other devices and components, for example any other component of any device disclosed herein or any other device, in such a manner as to enable apparatus 800 and such other devices and/or components to perform any of the disclosed functions and methods.

As depicted in FIG. 7, the apparatus 800 may comprise a processing portion 802, a memory portion 804, and an input/output portion 806. The processing portion 802, memory portion 804, and input/output portion 806 are coupled together (coupling not shown in FIG. 7) to allow communications between these portions. The input/output portion 806 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 800 may be implemented as a client processor and/or a server processor. In a basic configuration, the apparatus 800 may include at least one processing portion 802 and memory portion 804. The memory portion 804 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for system 100, 200, 300, or 400, text and data communications, calls, voicemail, multimedia content, visual voicemail applications, etc. Depending upon the exact configuration and type of processor, the memory portion 804 can be volatile (such as RAM) 808, non-volatile (such as ROM, flash memory, etc.) 810, or a combination thereof. The apparatus 800 can have additional features/functionality. For example, the apparatus 800 may include additional storage (removable storage 812 and/or non-removable storage 814) including, but not limited to, magnetic or optical disks, tape, flash, smart cards or a combination thereof. Computer storage media, such as memory and storage elements 804, 808, 810, 812, and 814, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 600. Any such computer storage media may be part of the apparatus 800. Any computer-readable storage medium described herein, including memory, is not to be construed as a signal, transient signal, or propagating signal. Memory, as well as any computer-readable storage medium described herein, is to be construed as an article of manufacture.

The apparatus 800 may also contain the communications connection(s) 820 that allow the apparatus 800 to communicate with other devices, for example through a radio access network (RAN). Communications connection(s) 820 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 800 also can have input device(s) 816 such as keyboard, keypad, mouse, pen, voice input device, touch input device, etc. Output device(s) 818 such as a display, speakers, printer, etc., also can be included.

A RAN as described herein may comprise any telephony radio network, or any other type of communications network, wireline or wireless, or any combination thereof. The following description sets forth some exemplary telephony radio networks and non-limiting operating environments. The below-described operating environments should be considered non-exhaustive, however, and thus the below-described network architectures merely show how software-defined socket activation may be implemented with stationary and non-stationary network structures and architectures. It can be appreciated, however, that software-defined socket activation as described herein may be incorporated with existing and/or future alternative architectures for communication networks as well.

In the following, depending on context, the term "mobile subscriber" sometimes refers to the end user and sometimes to the actual portable device, such as a mobile device, used by an end user of the mobile cellular service.

FIG. 8 illustrates a public land mobile network (PLMN) block diagram view of an exemplary architecture in which software-defined socket activation may be incorporated. Mobile Station (MS) 901 is the physical equipment used by the PLMN subscriber. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node B(s) 922. RNS 920 may support one or more cells. RNS 920 may also include one or more RNC 921/Node B 922 pairs or alternatively a single RNC 921 may manage multiple Node Bs 922. RNS 920 is responsible for communicating with Mobile Station 901 in its geographically defined area. RNC 921 is responsible for controlling the Node B(s) 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In an illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical example, user equipment may be classified as either "white listed" or "black listed" depending on its status in the network. In one example, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

Figure 9:
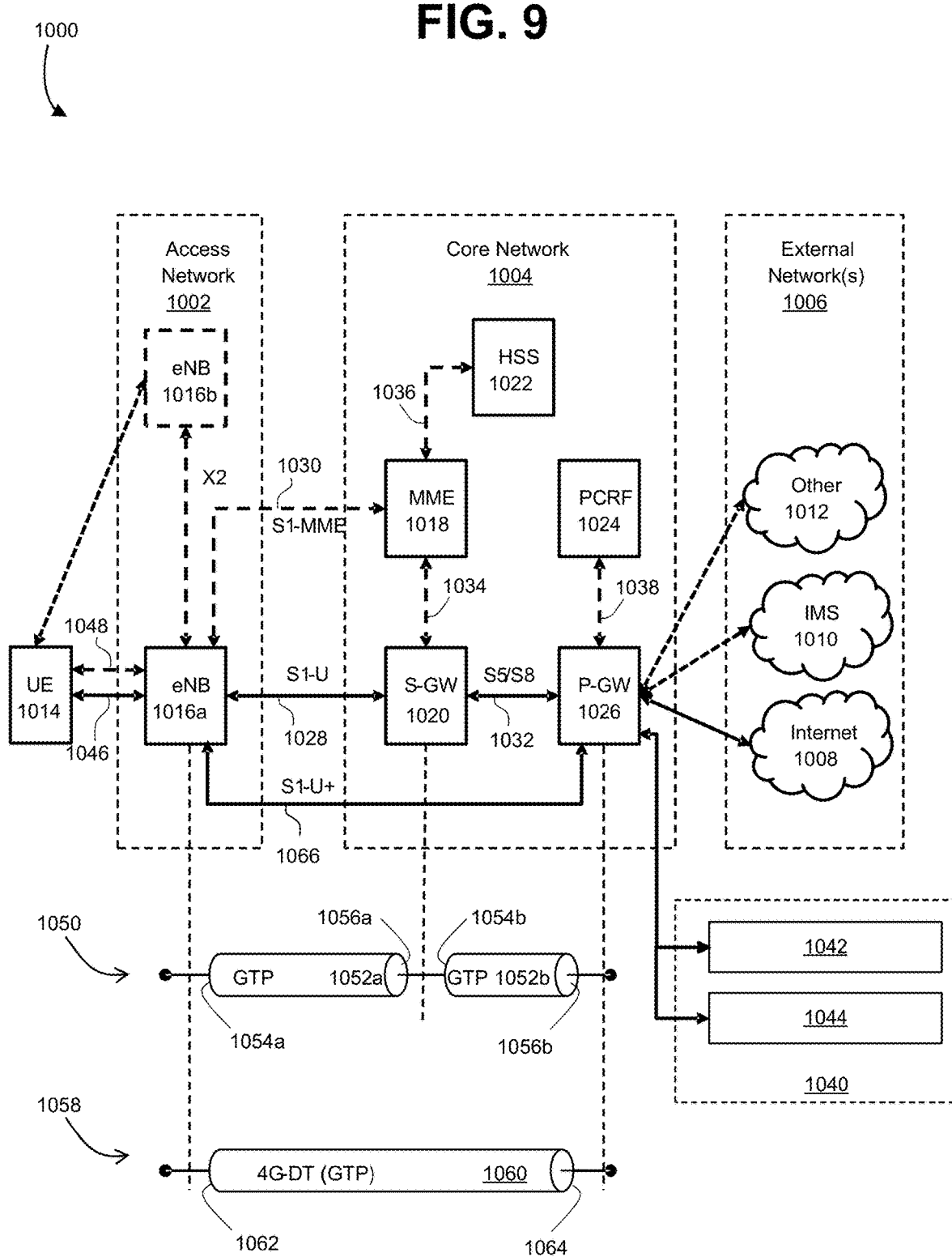
FIG. 9 is an illustrative network in which one or more disclosed examples may be implemented for software-defined socket activation.

FIG. 9 illustrates a functional block diagram depicting one example of an LTE-EPS network architecture 1000 related to the current disclosure. In particular, the network architecture 1000 disclosed herein is referred to as a modified LTE-EPS architecture 800 to distinguish it from a traditional LTE-EPS architecture.

An example modified LTE-EPS architecture 1000 is based at least in part on standards developed by the 3rd Generation Partnership Project (3GPP), with information available at www.3gpp.org. In one embodiment, the LTE-EPS network architecture 1000 includes an access network 1002, a core network 1004, e.g., an EPC or Common BackBone (CBB) and one or more external networks 1006, sometimes referred to as PDN or peer entities. Different external networks 1006 can be distinguished from each other by a respective network identifier, e.g., a label according to DNS naming conventions describing an access point to the PDN. Such labels can be referred to as Access Point Names (APN). External networks 1006 can include one or more trusted and non-trusted external networks such as an internet protocol (IP) network 1008, an IP multimedia subsystem (IMS) network 1010, and other networks 1012, such as a service network, a corporate network, or the like.

Access network 1002 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 1002 can include one or more communication devices, commonly referred to as UE 1014, and one or more wireless access nodes, or base stations 1016*a*, 1016*b*. During network operations, at least one base station 1016 communicates directly with UE 1014. Base station 1016 can be an evolved Node B (e-NodeB), with which UE 1014 communicates over the air and wirelessly. UEs 1014 can include, without limitation, wireless devices, e.g., satellite communication systems, portable digital assistants (PDAs), laptop computers, tablet devices and other mobile devices (e.g., cellular telephones, smart appliances, and so on). UEs 1014 can connect to eNBs 1016 when UE 1014 is within range according to a corresponding wireless communication technology.

UE 1014 generally runs one or more applications that engage in a transfer of packets between UE 1014 and one or more external networks 1006. Such packet transfers can include one of downlink packet transfers from external network 1006 to UE 1014, uplink packet transfers from UE 1014 to external network 1006 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 1004, e.g., according to parameters, such as the QoS.

Core network 1004 uses a concept of bearers, e.g., EPS bearers, to route packets, e.g., IP traffic, between a particular gateway in core network 1004 and UE 1014. A bearer refers generally to an IP packet flow with a defined QoS between the particular gateway and UE 1014. Access network 1002, e.g., E UTRAN, and core network 1004 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 1004 includes various network entities, such as MME 1018, SGW 1020, Home Subscriber Server (HSS) 1022, Policy and Charging Rules Function (PCRF) 1024 and PGW 1026. In one embodiment, MME 1018 comprises a control node performing a control signaling between various equipment and devices in access network 1002 and core network 1004. The protocols running between UE 1014 and core network 1004 are generally known as Non-Access Stratum (NAS) protocols.

For illustration purposes only, the terms MME 1018, SGW 1020, HSS 1022 and PGW 1026, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 1020 routes and forwards all user data packets. SGW 1020 also acts as a mobility anchor for user plane operation during handovers between base stations, e.g., during a handover from first eNB 1016*a* to second eNB 1016*b* as may be the result of UE 1014 moving from one area of coverage, e.g., cell, to another. SGW 1020 can also terminate a downlink data path, e.g., from external network 1006 to UE 1014 in an idle state, and trigger a paging operation when downlink data arrives for UE 1014. SGW 1020 can also be configured to manage and store a context for UE 1014, e.g., including one or more of parameters of the IP bearer service and network internal routing information. In addition, SGW 1020 can perform administrative functions, e.g., in a visited network, such as collecting information for charging (e.g., the volume of data sent to or received from the user), and/or replicate user traffic, e.g., to support a lawful interception. SGW 1020 also serves as the mobility anchor for interworking with other 3GPP technologies such as universal mobile telecommunication system (UMTS).

At any given time, UE 1014 is generally in one of three different states: detached, idle, or active. The detached state is typically a transitory state in which UE 1014 is powered on but is engaged in a process of searching and registering with network 1002. In the active state, UE 1014 is registered with access network 1002 and has established a wireless connection, e.g., radio resource control (RRC) connection, with eNB 1016. Whether UE 1014 is in an active state can depend on the state of a packet data session, and whether there is an active packet data session. In the idle state, UE 1014 is generally in a power conservation state in which UE 1014 typically does not communicate packets. When UE 1014 is idle, SGW 1020 can terminate a downlink data path, e.g., from one peer entity 1006, and triggers paging of UE 1014 when data arrives for UE 1014. If UE 1014 responds to the page, SGW 1020 can forward the IP packet to eNB 1016a.

HSS 1022 can manage subscription-related information for a user of UE 1014. For example, HSS 1022 can store information such as authorization of the user, security requirements for the user, quality of service (QoS) requirements for the user, etc. HSS 1022 can also hold information about external networks 1006 to which the user can connect, e.g., in the form of an APN of external networks 1006. For example, MME 1018 can communicate with HSS 1022 to determine if UE 1014 is authorized to establish a call, e.g., a voice over IP (VoIP) call before the call is established.

PCRF 1024 can perform QoS management functions and policy control. PCRF 1024 is responsible for policy control decision-making, as well as for controlling the flow-based charging functionalities in a policy control enforcement function (PCEF), which resides in PGW 1026. PCRF 1024 provides the QoS authorization, e.g., QoS class identifier and bit rates that decide how a certain data flow will be treated in the PCEF and ensures that this is in accordance with the user's subscription profile.

PGW 1026 can provide connectivity between the UE 1014 and one or more of the external networks 1006. In illustrative network architecture 1000, PGW 1026 can be responsible for IP address allocation for UE 1014, as well as one or more of QoS enforcement and flow-based charging, e.g., according to rules from the PCRF 1024. PGW 1026 is also typically responsible for filtering downlink user IP packets into the different QoS-based bearers. In at least some embodiments, such filtering can be performed based on traffic flow templates. PGW 1026 can also perform QoS enforcement, e.g., for guaranteed bit rate bearers. PGW 1026 also serves as a mobility anchor for interworking with non-3GPP technologies such as CDMA2000.

Within access network 1002 and core network 1004 there may be various bearer paths/interfaces, e.g., represented by solid lines 1028 and 1030. Some of the bearer paths can be referred to by a specific label. For example, solid line 1028 can be considered an S1-U bearer and solid line 1032 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 1004 can include various signaling bearer paths/interfaces, e.g., control plane paths/interfaces represented by dashed lines 1030, 434, 1036, and 1038. Some of the signaling bearer paths may be referred to by a specific label. For example, dashed line 1030 can be considered as an S1-MME signaling bearer, dashed line 1034 can be considered as an S11 signaling bearer and dashed line 1036 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 1066. In the illustrative example, the S1-U+ user plane interface extends between the eNB 1016a and PGW 1026. Notably, S1-U+ path/interface does not include SGW 1020, a node that is otherwise instrumental in configuring and/or managing packet forwarding between eNB 1016a and one or more external networks 1006 by way of PGW 1026.

In some embodiments, PGW 1026 is coupled to storage device 1040, shown in phantom. Storage device 1040 can be integral to one of the network nodes, such as PGW 1026, for example, in the form of internal memory and/or disk drive. It is understood that storage device 1040 can include registers suitable for storing address values. Alternatively or in addition, storage device 1040 can be separate from PGW 1026, for example, as an external hard drive, a flash drive, and/or network storage.

Storage device 1040 selectively stores one or more values relevant to the forwarding of packet data. For example, storage device 1040 can store identities and/or addresses of network entities, such as any of network nodes 1018, 1020, 1022, 1024, and 1026, eNBs 1016 and/or UE 1014. In the illustrative example, storage device 1040 includes a first storage location 1042 and a second storage location 1044. First storage location 1042 can be dedicated to storing a Currently Used Downlink address value 1042. Likewise, second storage location 1044 can be dedicated to storing a Default Downlink Forwarding address value 1044. PGW 1026 can read and/or write values into either of storage locations 1042, 1044, for example, managing Currently Used Downlink Forwarding address value 1042 and Default Downlink Forwarding address value 1044 as disclosed herein.

In some embodiments, the Default Downlink Forwarding address for each EPS bearer is the SGW S5-U address for each EPS Bearer. The Currently Used Downlink Forwarding address" for each EPS bearer in PGW 1026 can be set every time when PGW 1026 receives an uplink packet, e.g., a GTP-U uplink packet, with a new source address for a corresponding EPS bearer. When UE 1014 is in an idle state, the "Current Used Downlink Forwarding address" field for each EPS bearer of UE 1014 can be set to a "null" or other suitable value.

In some embodiments, the Default Downlink Forwarding address is only updated when PGW 1026 receives a new SGW S5-U address in a predetermined message or messages. For example, the Default Downlink Forwarding address is only updated when PGW 1026 receives one of a Create Session Request, Modify Bearer Request and Create Bearer Response messages from SGW 1020.

As values 1042, 1044 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 1002 and core network 1004 are illustrated in a simplified block diagram in FIG. 9. In other words, either or both of access network 1002 and the core network 1004 can include additional network elements that are not shown, such as various routers, switches and controllers. In addition, although FIG. 9 illustrates only a single one of each of the various network elements, it should be noted that access network 1002 and core network 1004 can include any number of the various network elements. For example, core network 1004 can include a pool (i.e., more than one) of MMEs 1018, SGWs 1020 or PGWs 1026.

In the illustrative example, data traversing a network path between UE 1014, eNB 1016a, SGW 1020, PGW 1026 and external network 1006 may be considered to constitute data transferred according to an end-to-end IP service. However, for the present disclosure, to properly perform establishment management in LTE-EPS network architecture 800, the core network, data bearer portion of the end-to-end IP service is analyzed.

An establishment may be defined herein as a connection set up request between any two elements within LTE-EPS network architecture 800. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 1014 and eNB 1016a, a second portion (e.g., an S1 data bearer 1028) between eNB 1016a and SGW 1020, and a third portion (e.g., an S5/S8 bearer 1032) between SGW 1020 and PGW 1026. Various signaling bearer portions are also illustrated in FIG. 4. For example, a first signaling portion (e.g., a signaling radio bearer 1048) between UE 1014 and eNB 1016a, and a second signaling portion (e.g., S1 signaling bearer 1030) between eNB 1016a and MME 1018.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 800, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 1050 includes a first tunnel 1052a between two tunnel endpoints 1054a and 1056a, and a second tunnel 1052b between two tunnel endpoints 1054b and 1056b. In the illustrative example, first tunnel 1052a is established between eNB 1016a and SGW 1020. Accordingly, first tunnel 1052a includes a first tunnel endpoint 1054a corresponding to an S1-U address of eNB 1016a (referred to herein as the eNB S1-U address), and second tunnel endpoint 1056a corresponding to an S1-U address of SGW 1020 (referred to herein as the SGW S1-U address). Likewise, second tunnel 1052b includes first tunnel endpoint 1054b corresponding to an S5-U address of SGW 1020 (referred to herein as the SGW S5-U address), and second tunnel endpoint 1056b corresponding to an S5-U address of PGW 1026 (referred to herein as the PGW S5-U address).

In at least some embodiments, first tunnel solution 1050 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 1058 includes a single or direct tunnel 1060 between tunnel endpoints 1062 and 1064. In the illustrative example, direct tunnel 1060 is established between eNB 1016a and PGW 1026, without subjecting packet transfers to processing related to SGW 1020. Accordingly, direct tunnel 1060 includes first tunnel endpoint 1062 corresponding to the eNB S1-U address, and second tunnel endpoint 1064 corresponding to the PGW S5-U address. Packet data received at either end can be encapsulated into a payload and directed to the corresponding address of the other end of the tunnel. Such direct tunneling avoids processing, e.g., by SGW 1020 that would otherwise relay packets between the same two endpoints, e.g., according to a protocol, such as the GTP-U protocol.

In some scenarios, direct tunneling solution 1058 can forward user plane data packets between eNB 1016a and PGW 1026, by way of SGW 1020. That is, SGW 1020 can serve a relay function, by relaying packets between two tunnel endpoints 1016a, 1026. In other scenarios, direct tunneling solution 1058 can forward user data packets between eNB 1016a and PGW 1026, by way of the S1 U+ interface, thereby bypassing SGW 1020.

Generally, UE 1014 can have one or more bearers at any one time. The number and types of bearers can depend on applications, default requirements, and so on. It is understood that the techniques disclosed herein, including the configuration, management and use of various tunnel solutions 1050, 1058, can be applied to the bearers on an individual bases. That is, if user data packets of one bearer, say a bearer associated with a VoIP service of UE 1014, then the forwarding of all packets of that bearer are handled in a similar manner. Continuing with this example, the same UE 1014 can have another bearer associated with it through the same eNB 1016a. This other bearer, for example, can be associated with a relatively low rate data session forwarding user data packets through core network 1004 simultaneously with the first bearer. Likewise, the user data packets of the other bearer are also handled in a similar manner, without necessarily following a forwarding path or solution of the first bearer. Thus, one of the bearers may be forwarded through direct tunnel 1058; whereas, another one of the bearers may be forwarded through a two-tunnel solution 1050.

While example embodiments of software-defined socket activation have been described in connection with various computing devices/processors, the underlying concepts may be applied to any computing device, processor, or system capable of facilitating intelligent traffic routing. The various techniques described herein may be implemented in connection with hardware or software or, where appropriate, with a combination of both. Thus, the methods and apparatuses for software-defined socket activation, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for intelligent traffic routing, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with software-defined socket activation as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing intelligent traffic routing as described herein. When implemented on a general-purpose processor, the program code combines with the processor to provide a unique apparatus that operates to invoke the functionality of intelligent traffic routing as described herein.

While systems and methods for software-defined socket activation have been described in connection with the various embodiments of the various figures, it is to be understood that other similar embodiments may be used or modifications and additions may be made to the described embodiments of systems and methods for software-defined socket activation without deviating therefrom. For example, one skilled in the art will recognize that systems and methods for software-defined socket activation as described in the instant application may apply to any environment, whether wired or wireless, and may be applied to any number of such devices connected via a communications network and interacting across the network. Therefore, systems and methods for software-defined socket activation as described herein should not be limited to any single embodiment, but rather should be construed in breadth and scope in accordance with the appended claims.

The methods and apparatuses associated with mobile emergency response networks as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing intelligent traffic routing as described herein. When implemented on a general-purpose processor, the program code combines with the processor to provide a unique apparatus that operates to invoke the functionality of intelligent traffic routing as described herein.

While mobile emergency response networks have been described in connection with the various embodiments of the various figures, it is to be understood that other similar embodiments may be used or modifications and additions may be made to the described embodiments of mobile emergency response networks without deviating therefrom. For example, one skilled in the art will recognize that mobile emergency response networks as described in the instant application may apply to any environment, whether wired or wireless, and may be applied to any number of such devices connected via a communications network and interacting across the network. Therefore, mobile emergency response networks as described herein should not be limited to any single embodiment, but rather should be construed in breadth and scope in accordance with the appended claims.

What is claimed:

1. A system comprising:
   a processor; and
   a memory coupled to the processor, the memory having executable instructions stored thereon that cause the processor to effectuate operations comprising:
      receiving a request for a cloud resource;
      responsive to receiving the request, generating an instance of the cloud resource and associating an address with the instance;
      inserting the address into a forwarding table of a switch; and
      employing the switch to forward traffic to the cloud resource.

2. The system of claim 1, wherein the computer-executable instructions cause the processor to perform further operations comprising:
   shutting down the instance of the cloud resource responsive to the instance becoming idle.

3. The system of claim 1, wherein the computer-executable instructions cause the processor to perform further operations comprising:
   configuring the switch responsive to receiving the request.

4. The system of claim 3, wherein the switch comprises a virtual switch and configuring the switch comprises instantiating the virtual switch.

5. The system of claim 4, wherein the virtual switch is instantiated based on a determination that a flow table of a physical switch cannot be accessed or modified.

6. The system of claim 4, wherein the virtual switch is configured to forward traffic to the physical switch.

7. The system of claim 1, wherein the cloud resource comprises a virtual machine.

8. A method comprising:
   receiving, by a controller, a request for a cloud resource;
   responsive to receiving the request, generating, by the controller, an instance of the cloud resource and associating an address with the instance;
   inserting, by the controller, the address into a forwarding table of a switch; and
   employing the switch to forward traffic to the instance of the cloud resource.

9. The method of claim 8, further comprising:
   shutting down, by the controller, the instance of the cloud resource responsive to the instance of the cloud resource becoming idle.

10. The method of claim 8, further comprising:
    configuring, by the controller, the switch responsive to receiving the request.

11. The method of claim 10, wherein the switch comprises a virtual switch and configuring the switch comprises instantiating the virtual switch.

12. The method of claim 11, wherein the virtual switch is instantiated based on a determination, by the controller, that a flow table of a physical switch cannot be accessed or modified.

13. The method of claim 11, wherein the virtual switch is configured by the controller to forward traffic to the physical switch.

14. The method of claim 8, wherein the cloud resource comprises a container.

15. A tangible computer-readable storage medium comprising executable instructions that cause a processor executing the instructions to effectuate operations comprising:
   receiving a request for a cloud resource;
   responsive to receiving the request, generating an instance of the cloud resource and associating an address with the instance of the cloud resource;
   inserting the address into a forwarding table of a switch; and
   employing the switch to forward traffic to the instance of the cloud resource.

16. The computer-readable storage medium of claim 15, wherein the operations further comprise:
   shutting down the instance of the cloud resource responsive to the instance of the cloud resource becoming idle.

17. The computer-readable storage medium of claim 15, wherein the operations further comprise:
   configuring the switch responsive to receiving the request.

18. The computer-readable storage medium of claim 17, wherein the switch comprises a virtual switch and configuring the switch comprises instantiating the virtual switch.

19. The computer-readable storage medium of claim 18, wherein the virtual switch is instantiated based on a determination that a flow table of a physical switch cannot be accessed or modified.

20. The computer-readable storage medium of claim 18, wherein the virtual switch is configured to forward traffic to the physical switch.

* * * * *